United States Patent

[11] 3,633,874

[72] Inventor Hubertus Leonardus Martinus Veugelers, Jr.
De Genestetlaan 103, The Hague, Netherlands
[21] Appl. No. 835,350
[22] Filed June 23, 1969
[45] Patented Jan. 11, 1972
[32] Priority June 26, 1968
[33] Netherlands
[31] 6808967

[54] DIAPHRAGM VALVE
2 Claims, 1 Drawing Fig.
[52] U.S. Cl. .................................... 251/330, 251/331
[51] Int. Cl. .................................... F16k 7/16
[50] Field of Search .......................... 251/331, 330

[56] References Cited
UNITED STATES PATENTS

| | | | |
|---|---|---|---|
| 58,600 | 10/1866 | Coffin | 251/330 X |
| 24,416 | 6/1859 | Tate | 251/331 X |
| 243,118 | 6/1881 | Garsed | 251/331 |
| 1,771,410 | 7/1930 | Landis | 251/331 X |
| 1,992,043 | 2/1935 | Saunders | 251/331 X |
| 2,054,340 | 9/1936 | Saunders | 251/331 |

FOREIGN PATENTS

| 633,144 | 10/1927 | France | 251/331 |
|---|---|---|---|

Primary Examiner—Arnold Rosenthal
Attorney—Irving M. Weiner

ABSTRACT: In a diaphragm valve comprising a fixed diaphragm cooperating with a loose movable central presser member, having a conically shaped periphery.

PATENTED JAN 11 1972
3,633,874
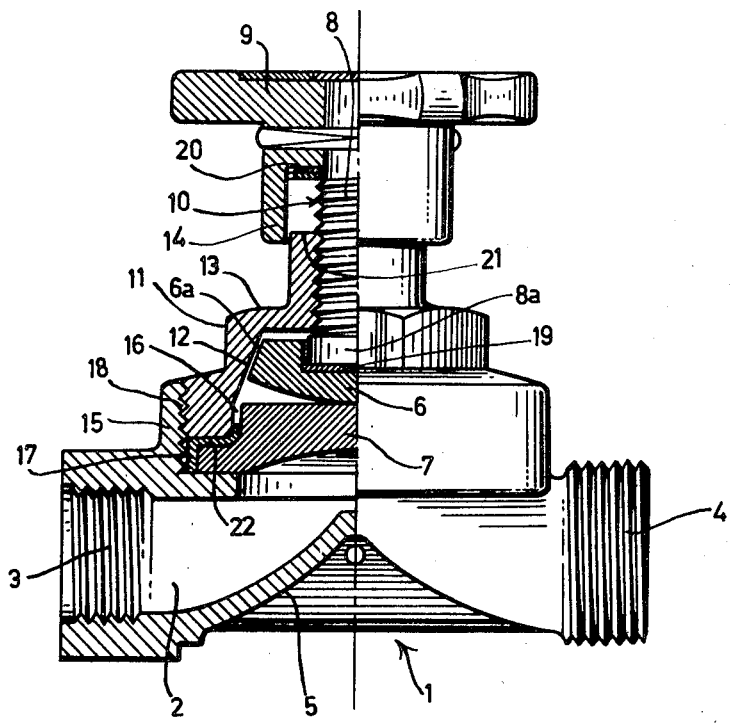
INVENTOR
HUBERTUS LEONARDUS MARTINUS VEUGELERS, JR.
BY
*Irving M. Weiner*
ATTORNEY

DIAPHRAGM VALVE

The invention relates to a diaphragm valve comprising a valve body having a part provided with a pipe having an inlet and outlet, in which pipe a cross seat barrier is provided, and a movable central presser member for a fixed diaphragm, the presser member being confined in a hood which is connected with the valve part.

Such diaphragm valves are known. A drawback of said shutoff valves is that they are less suitable for use at high pressures, as on securing the diaphragm same can be easily damaged.

It is now an object of the invention to provide a diaphragm valve which is specially adapted to high pressures. This object is attained according to the invention in the way that the loose presser member has a conically shaped periphery.

Due to the conical periphery, an optimum sealing is obtained against a sealing ring which can cooperate with the presser member. The free movability of the presser member is furthermore advantageous in that in the event of extremely high external temperatures the rubber of the diaphragm due to vulcanization can adhere to the presser member whereby in that case the presser member together with the adhering rubber of the membrane falls down and will settle on the seat barrier while shutting off the medium flow through the pipe.

The invention is hereinafter clarified with reference to the drawing in which a cross section of the diaphragm valve according to the invention is represented.

Represented in the FIGURE is a diaphragm valve consisting of a valve body 1 including a length of pipe 2, an inlet 3 and an outlet 4. A cross seat barrier 5 is provided in the length of pipe.

A diaphragm or displaceable membrane 7 can be pressed on the seat barrier by the aid of a freely movable presser member in the shape of a diaphragm pusher 6. This diaphragm pressure member 6 is provided with a conically shaped periphery 6a. The presser member 6 can be moved by means of a spindle 8 with a widened end 8a, this spindle being connected with the operating means in the shape of a handwheel 9.

The outer side of the spindle 8 is provided with screw thread 10 which can cooperate with internal screw thread provided on a hood 11. This hood 11 is by means of screw thread connected with an upright flange 15. This upright flange 15, constituting a cup-shaped portion 16, has on its inner side a screw thread 17 which cooperates with screw thread 18 on the outer wall of the hood 11.

A metal plate 19 such as a bronze plate, is provided between the widened end 8a of spindle 8 and presser member 6.

In order to achieve a sealing in the closed position of the shutoff valve, a sealing ring 20 is provided under the handwheel 9 and around the spindle 8. The sealing ring 20 is capable of cooperation with the flat upper part 21 of the hood 11, whereby in this position the membrane 7 cannot be damaged on the seat barrier owing to unallowed high pressures. It is evident that the length of the ring 14 which can cooperate with a part 13 of the hood 11 should be related thereto.

A ring 22 is provided in order to prevent the membrane 7 from being damaged on tightening the hood 11. The hood 11 is partially provided with an inner wall portion 12 having the same conical shape as the periphery 6a of the diaphragm pusher 6. This conical diaphragm pusher fits the shutoff valve to a high degree for high pressures, since the conical shape ensures an extraordinary effective sealing.

The membrane is preferably constructed as a preformed resilient part, which when a fluid is passed through the duct 2 leaves the largest possible passage free at the location of the seat barrier, the arrangement being such that the cross section available for the fluid remains almost unchanged.

Contrary to the known constructions in which the membrane is lifted by the operating means, the membrane can freely move what in practice has appeared to be of great importance.

Having thus described the invention and manner of its operation what I claim as my invention is:

1. A valve comprising
    a body having a fluid inlet, a fluid outlet, an opening between said inlet and said outlet, and having a conical wall surface,
    a displaceable resilient membrane sealed around its periphery to said body around said opening, said displaceable resilient membrane cooperating with said body to form a sealed chamber therewithin, partially defined by said conical wall surface,
    a valve seat within said body between said inlet and said outlet and below said displaceable membrane, said displaceable resilient membrane displaceable to engage said seat to control flow from said inlet to said outlet,
    a stem movable to displace and release said displaceable resilient membrane, and
    a presser member loosely retained within said chamber between the lower end of said stem and said displaceable resilient member and supported solely by the latter, said presser member having a conical surface outer periphery for sealed engagement with said conical surface on the body in the valve full open position.

2. A valve as defined by claim 1 wherein said presser member has a recess in its upper surface to loosely receive a lower end portion of said stem.

* * * * *